United States Patent
Cole, III

(10) Patent No.: US 7,418,791 B2
(45) Date of Patent: Sep. 2, 2008

(54) APPARATUS AND METHODS FOR IMBEDDED RUBBER OUTER

(76) Inventor: Charles D. Cole, III, 405 W. Palm Ave., Redlands, CA (US) 92373

( * ) Notice: Subject to any disclaimer, the term of this patent is extended or adjusted under 35 U.S.C. 154(b) by 272 days.

(21) Appl. No.: 10/492,227

(22) PCT Filed: Oct. 10, 2002

(86) PCT No.: PCT/US02/32355

§ 371 (c)(1), (2), (4) Date: Apr. 8, 2004

(87) PCT Pub. No.: WO03/030670

PCT Pub. Date: Apr. 17, 2003

(65) Prior Publication Data

US 2004/0205981 A1 Oct. 21, 2004

Related U.S. Application Data

(60) Provisional application No. 60/328,157, filed on Oct. 10, 2001.

(51) Int. Cl.
*A43B 13/12* (2006.01)

(52) U.S. Cl. .................. 36/30 R; 36/25 R; 36/31

(58) Field of Classification Search ............ 36/30 R, 36/32 R, 4, 14, 86, 98, 22 R, 31, 25 R
See application file for complete search history.

(56) References Cited

U.S. PATENT DOCUMENTS 2,844,833 A * 7/1958 Odermatt ............. 12/146 B
2,931,110 A * 4/1960 Pietrocola ............. 36/30 R
3,492,744 A * 2/1970 Bernier et al. .......... 36/59 R
3,824,716 A   7/1974 DiPaolo
4,562,606 A * 1/1986 Folschweiler .......... 12/142 RS
4,747,220 A * 5/1988 Autry et al. ............ 36/59 R
4,787,156 A * 11/1988 Bade .................... 36/128
4,899,467 A * 2/1990 Mackey ................. 36/59 A
5,657,556 A * 8/1997 Bemis ................... 36/30 R
6,145,221 A * 11/2000 Hockerson .............. 36/126
6,237,249 B1   5/2001 Aguerre
6,698,110 B1 * 3/2004 Robbins ................. 36/61
6,915,595 B2 * 7/2005 Kastner ................. 36/59 R

FOREIGN PATENT DOCUMENTS

GB         2139942 A  * 11/1984

* cited by examiner

*Primary Examiner*—Marie Patterson
(74) *Attorney, Agent, or Firm*—Khorsandi Patent Law Group, a Law Corporation; Marilyn R. Khorsandi

(57) ABSTRACT

The present invention provides apparatus and methods for imbedding a durable outer layer of rubber in a second layer of rubber, polyurethane, or like material for use in various applications, including but not limited to shoe soles and tires. As depicted in FIG., the durable outer layer, which in the case of FIG. 4 is a shoe outsole, may comprise a plurality of lugs (2) connected with integral support bridges (3) imbedded in another rubber or rubber-like material (17). Alternatively, the durable outer layer may comprise a plurality of lugs anchored in the second layer of rubber, polyurethane or the like, using anchors, such as ribs or flanges, radiating from the perimeter of each lug.

6 Claims, 7 Drawing Sheets

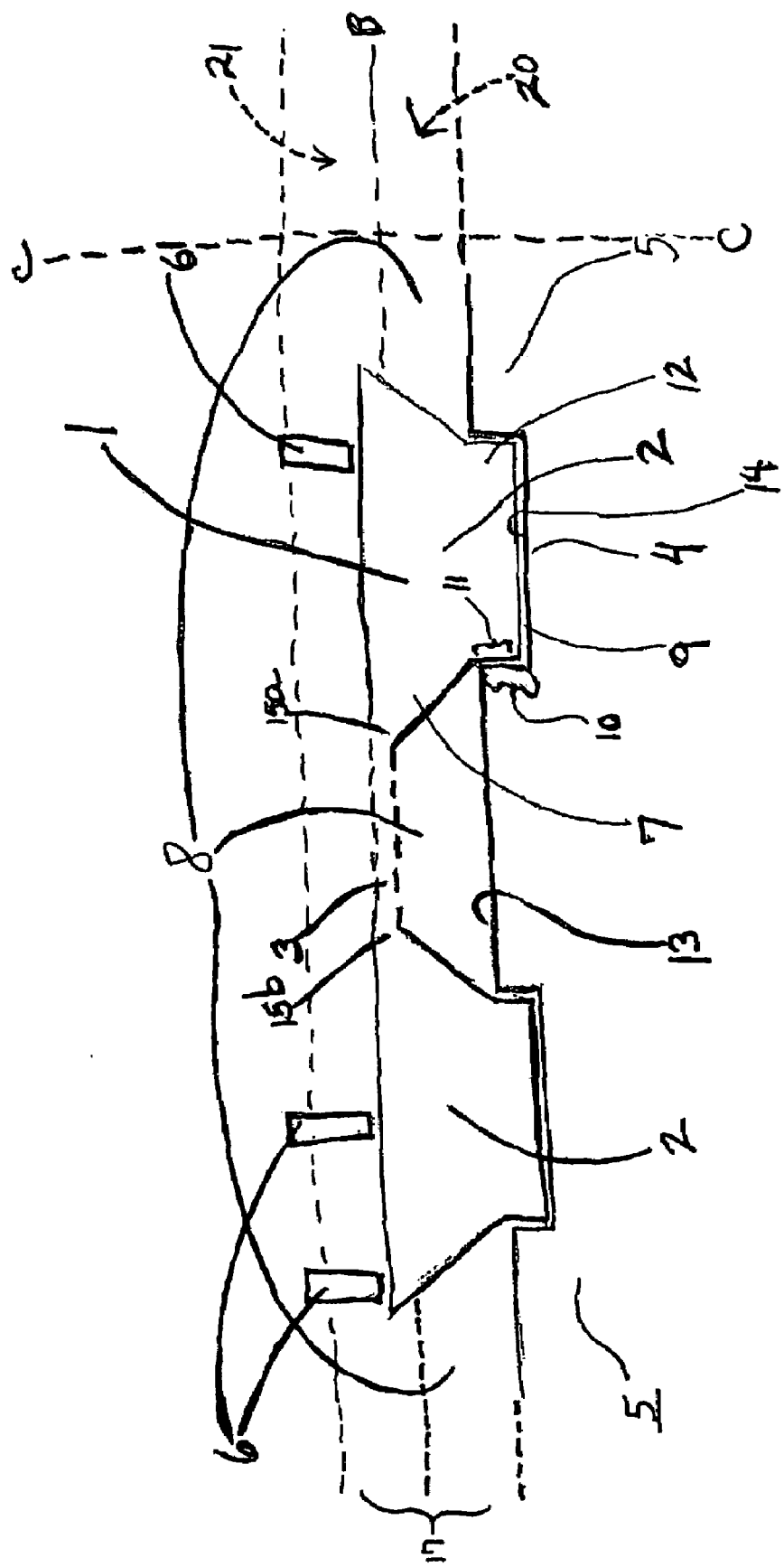

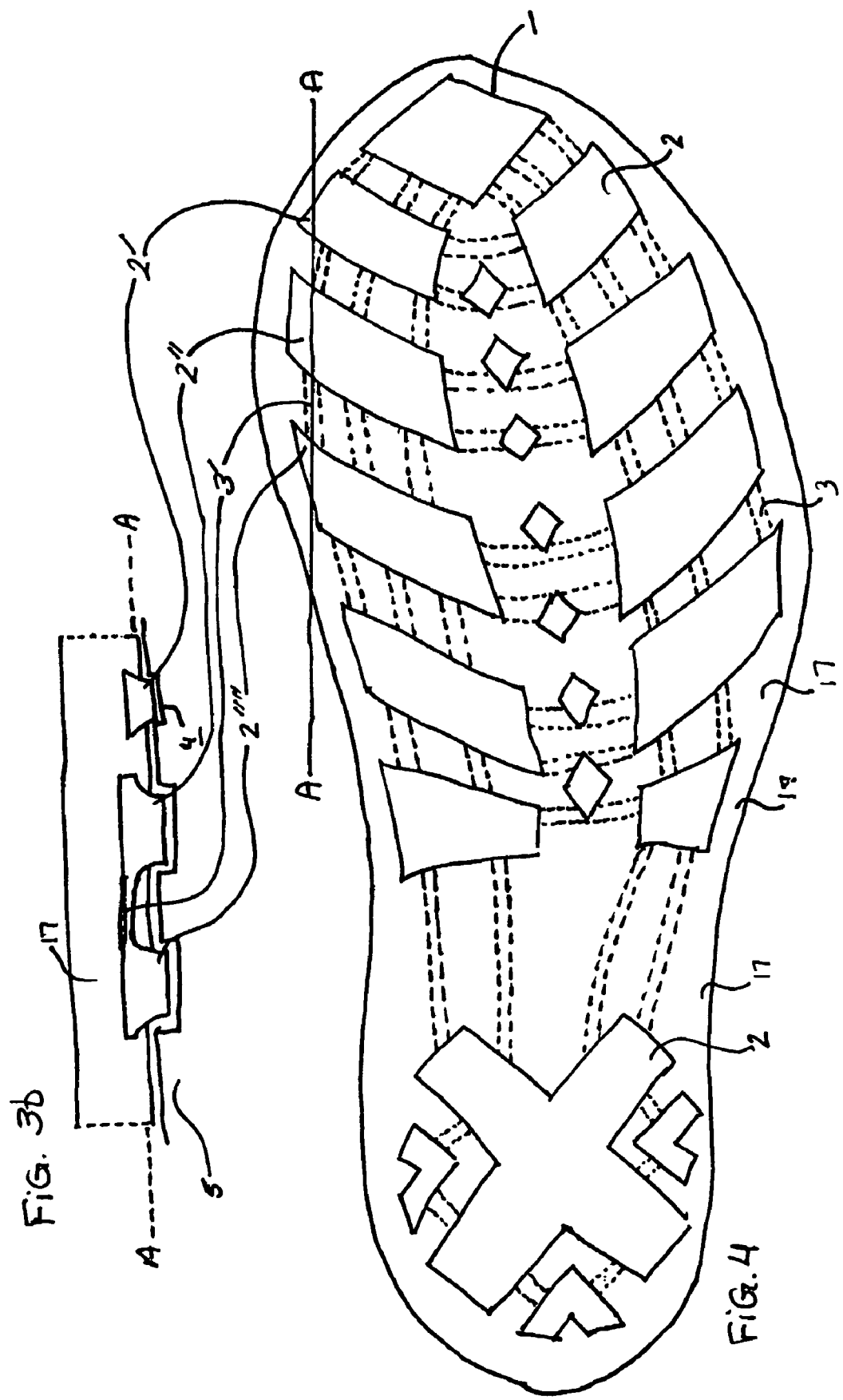

US 7,418,791 B2

APPARATUS AND METHODS FOR IMBEDDED RUBBER OUTER

CROSS REFERENCE TO RELATED APPLICATIONS

This is a U.S. National Stage Application of International Application No. PCT/US02/32355, International Filing Date Oct. 10, 2002, which claims benefit of U.S. Provisional Patent Application, Ser. No. 60/328,157, filed Oct. 10, 2001, the disclosure of which is incorporated by reference herein for all purposes as if fully stated here.

FIELD OF THE INVENTION

The field of the present invention is rubber outers and more specifically, rubber outer layers such as outsoles of shoes and outer layers of rubber tires.

BACKGROUND OF THE INVENTION

Many products use durable rubber as an outer layer. For example, tires, and shoe soles.

In the case of shoe soles, many types of shoes, such as athletic and sports shoes, have, in addition to an inner sole, a middle sole (sometimes referred to herein as a "midsole") and an outer sole (sometimes referred to herein as an "outsole"). Shoe midsoles typically use a rubber or polyurethane material that has cushioning and shock-absorbing characteristics, and that is lightweight. However, rubber or polyurethane material that has cushioning and shock-absorbing characteristics, and that is lightweight is generally not durable. Therefore, an outer sole of hard durable rubber is used to give the shoe better wearability.

In order to make shoes that have both a midsole and an outsole, typically, both soles are formed separately, such as by molding; the outsole is then aligned with the midsole so that the outsole can be fastened with a fastening agent, such as glue, or by sewing, to the midsole.

The process of separate formation of the two soles and the alignment and fastening with a fastening agent process adds to the expense of manufacturing a shoe, in terms of both machinery and human resources. Further, the reliability of the bond between a midsole and an outsole depend on the materials from which the midsole and outer sole are made, and depend on the fastening agent used.

A better shoe sole and a better way of making shoe soles is needed.

Similarly, with tires, an outer layer of hard durable rubber in the form of a tire tread is fastened to an inner layer of more shock-absorbing rubber or other material. Many automobile accidents have resulted from the separation of tire tread from the rest of a tire. A better way to make tires is needed.

SUMMARY OF THE INVENTION

The present invention provides apparatus and methods for imbedding a durable outer layer of rubber in a second layer of rubber, polyurethane, or like material for use in various applications, including but not limited to shoe soles and tires. The durable outer layer may comprise a continuous set of lugs connected with integral support bridges, or may be a set of lugs anchored in the second layer of rubber, polyurethane or the like, using anchors, such as ribs or flanges, radiating from the perimeter of each lug.

BRIEF DESCRIPTION OF THE DRAWINGS

These and other features of the present invention are more fully set forth in the following description of exemplary embodiments of the invention. The description is presented with reference to the accompanying drawings in which:

FIG. 3a is a side view of a portion of the rubber shoe outsole fitted into the midsole mold 5 in the exemplary embodiment of the present invention;

FIG. 3b is a side view of a midsole that has been poured into the midsole mold in an exemplary embodiment of the present invention:

FIG. 4 is a bottom view of a midsole of the exemplary embodiment of the present invention, from which detents of the rubber shoe outsole extend;

FIG. 5c is a cross-sectional side view of the first alternative exemplary lug and a first exemplary radial rib of the present invention, taken along line D-D of FIG. 5a;

FIG. 5d is a cross-sectional side view of the first alternative exemplary lug and a second exemplary radial rib of the present invention, taken along line D-D of FIG. 5a;

FIG. 6b is a cross-sectional side view of the third alternative exemplary lug and an exemplary perforated flange of the present invention, taken along line E-E of FIG. 6a;

FIG. 7b is a cross-sectional side view of the second alternative exemplary lug and an exemplary raised ridge flange of the present invention, taken along line F-F of FIG. 7a; and FIG. 7c is a cross-sectional side view of the second alternative exemplary lug and an exemplary flat flange of the present invention, taken along line F-F of FIG. 7a.

DETAILED DESCRIPTION OF THE INVENTION

Figure 1:
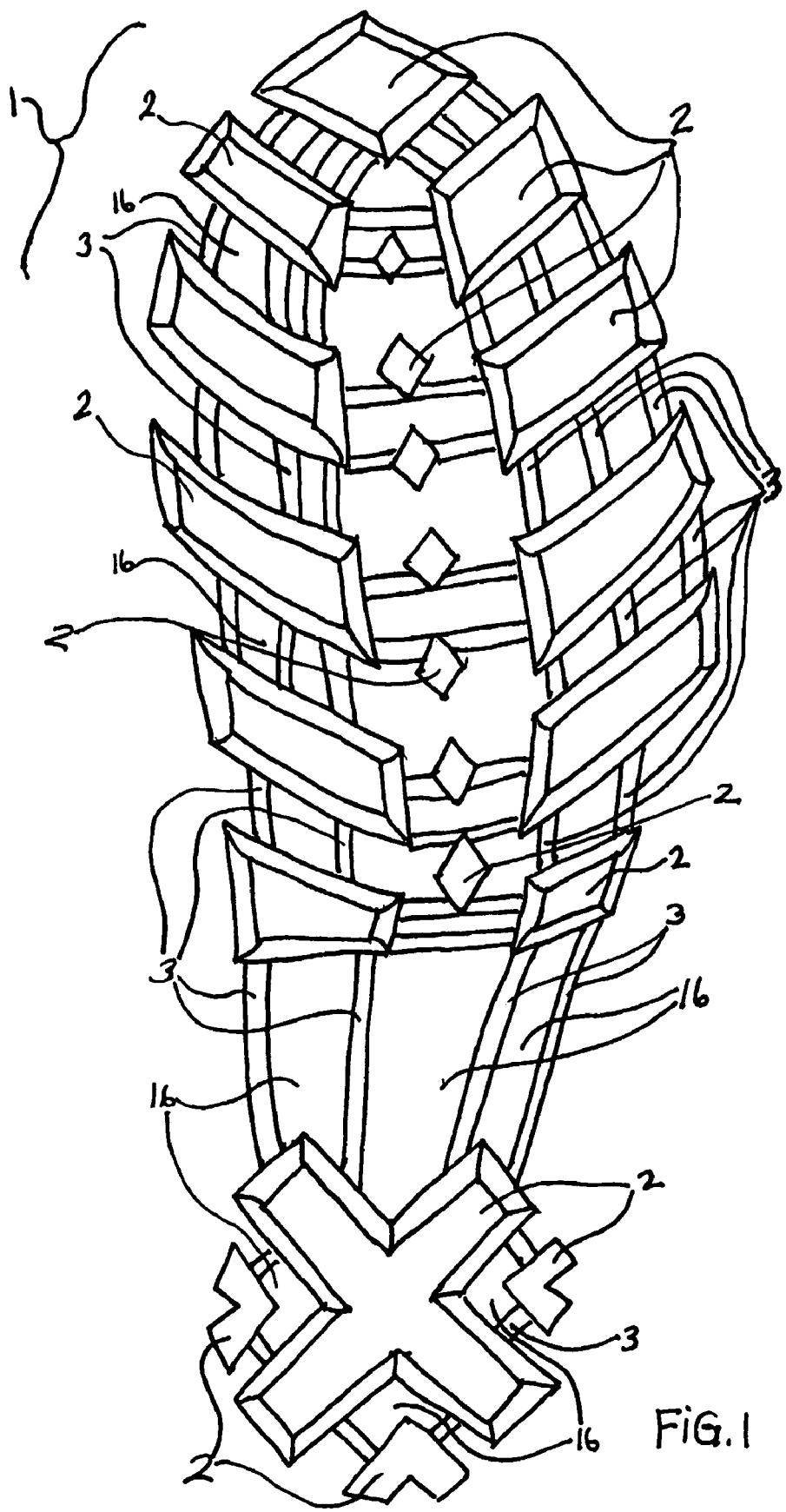
FIG. 1 is a bottom view of a rubber shoe outsole molded according to an exemplary embodiment of the present invention.

FIG. 1 is a bottom view of a rubber shoe outsole 1 molded according to an exemplary embodiment of the present invention. As depicted in FIG. 1, the rubber shoe outsole 1 comprises a plurality of outsole detents 2 of rubber. In the exemplary embodiment of the invention, a plurality of integral support bridges 3 connect contiguous outsole detents 2 (detents are also sometimes referred to herein as "lugs" 2).

It will be understood by someone with ordinary skill in the art that the size, exterior contact surface shape, number and arrangement of lugs 2 depicted in FIGS. 1 through 7care exemplary to illustrate the invention; the size, exterior contact surface shape, number and arrangement of the lugs can be varied without departing from the spirit of the invention.

Figure 2:
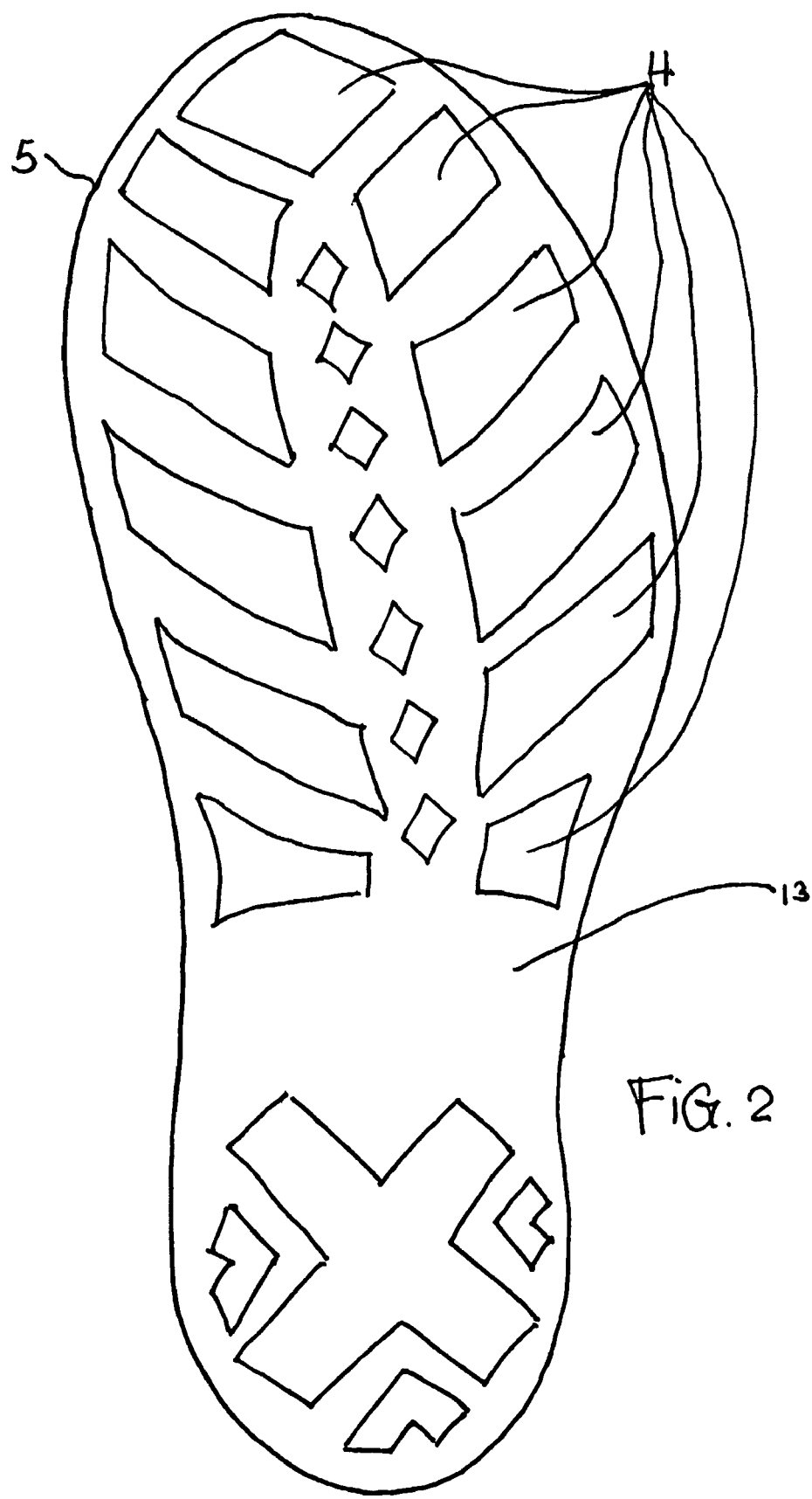
FIG. 2 is a top view of a midsole mold for polyurethane, or other like midsole material, in the exemplary embodiment of the present invention.

FIG. 2 is a top view of a midsole mold 5 for receiving the rubber shoe outsole 1 (see, e.g., FIG. 1) and for further receiving polyurethane, or other like midsole material, in the exemplary embodiment of the present invention. As depicted in FIG. 2, the midsole mold 5 comprises a surface 13 and a plurality of indentations 4 that correspond in location, horizontal size and horizontal shape to the respective outsole detents 2 of the rubber shoe outsole 1 (see, e.g., FIG. 1). It will be understood by someone with ordinary skill in the art that a midsole mold for receiving polyurethane may be made of metal or other materials.

FIG. 3a is a side view of a portion of the rubber shoe outsole 1 fitted into the midsole mold 5 in the exemplary embodiment of the present invention. As depicted in FIG. 3a, each exemplary detent 2 comprises a tapered portion 7 and a relatively non-tapered portion 12. In the exemplary embodiment of the invention, each indentation 4 in the midsole mole 5 has a depth 10 that is equal to or is less than the length 11 of the non-tapered portion of the corresponding detent 2. It will be understood by someone with ordinary skill in the art that the interior shape and size of each detent/lug 2 can be varied. For example, as described below in connection with FIGS. 5a through 7c, detents can be shaped without a tapered portion and a non-tapered portion; rather, ribs, flanges or other anchoring devices, can be provided to extend from the perimeter of each detent.

As depicted in FIG. 3a, in order to make a shoe sole according to the exemplary embodiment of the present invention, the rubber shoe outsole 1 of the exemplary embodiment is placed in the midsole mold 5 so that the bottom surface 9 of the non-tapered portion 12 rests on the bottom surface 14 of the corresponding indentation 4. When the rubber shoe outsole 1 is placed in the midsole mold 5 in this manner, the tapered portion 7 of each detent 2 extends above the surface 13 of the midsole mold 5 forming a pocket 8 for receiving midsole material, such as polyurethane. As depicted in FIG. 3a, in the exemplary embodiment of the present invention, one or more integral support bridges 3 connect upper edges 15a and 15b between two contiguous detents 2. In an alternative exemplary embodiment of the present invention, the integral support bridges 3 connect contiguous detents 2 at some corresponding position of the tapered portion 7 of each detent 2.

Returning for a moment to FIG. 1, spaces 16 are formed between integral support bridges 3 connecting two detents 2 and between detents 2.

Returning to FIG. 3a, in the exemplary embodiment of the invention, a plurality of pins 6 are used to stabilize the rubber shoe outsole 1 in its place in the midsole mold 5. Once the rubber shoe outsole 1 is in place in the midsole mold 5 and the plurality of pins are in place to stabilize the rubber shoe outsole 1, midsole material, such as polyurethane, is poured into the midsole mold 5. The midsole material that is poured into the midsole mold 5 flows through the spaces 16 (FIG. 1) into the pockets 8.

FIG. 3b is a cross-sectional side view along line A-A of FIG. 4 of a midsole 17 that has been poured into the midsole mold 5. As depicted in FIG. 3b, the poured midsole 17 mechanically imbeds in it the rubber shoe outsole I (see FIG. 1). The midsole 17 material surrounds the tapered portion 7 of each detent 2', 2" and 2"" and underlies the integral support bridges 3' (e.g., connecting detents 2" and 2"") so that the rubber shoe outsole 1 is anchored in and will not detach from its imbedded position within the midsole 17.

FIG. 4 is a bottom view of a midsole 17, from which the detents 2 of the rubber shoe outsole 1 extend. As depicted in FIG. 4, the integral support bridges 3 are not exposed from the midsole 17.

In one alternative exemplary embodiment, integral support bridges 3 are not used. Detents 2', and 2" depicted in FIG. 3b are shown imbedded in the poured midsole 17; no integral support bridges 3 connecting the detent 2' to any other detent are depicted in FIG. 3b. The drawback of using a no-bridge approach is that each detent 2' would need to be separately placed in its corresponding indentation 4 in the midsole mold 5. Even so, as described further below in connection with FIGS. 5a through 7c, detents/lugs 2 can be anchored in the midsole 17 using radial ribs 60, flanges 61, 70 (see FIGS. 5a through 7c) or other anchors.

In one alternative exemplary embodiment, the rubber shoe outsole 1 (see, e.g., FIG. 1) is only partially cured before it is placed in the midsole mold 5 (see, e.g., FIG. 2). After the midsole material is poured into the midsole mold 5 (see e.g., FIG. 2), the midsole material and the rubber shoe outsole 1 are cured together.

In another alternative exemplary embodiment of the present invention, EVA (ethylvinylacetate) is the material used to form the midsole 17 (see, e.g., FIGS. 3a, 3b). As someone with ordinary skill in the art will understand, EVA is not pourable as in the case of polyurethane. In this alternative exemplary embodiment, a first layer of EVA (ethylvinylacetate) is placed in the midsole mold 5, depicted as alternative layer 20 in FIG. 3a. In FIG. 3a, line B-B depicts a line between a first layer 20 of EVA and a second layer 21 of EVA. The first layer 20 of EVA may be pre-shaped to conform to the shape of the midsole mold 5 or may extend beyond the edges of the midsole mold 5 to be later trimmed. The first layer 20 of EVA is pre-cut (such as die-cut) to form holes corresponding in position, number, size and shape to the rubber outsole detents 2. The rubber shoe outsole 1 is then placed detent side down on top of the first layer 20 of EVA so that the bottom surface 9 of the non-tapered portion 12 of the detents 2 of the rubber shoe outsole 1 extend through the pre-cut holes in the first layer 20 of EVA and rest on the bottom surface 14 of the corresponding indentation 4 of the midsole mold 5. A second layer (depicted as alternative element 21 in FIG. 3a) of EVA is then placed on top of the rubber shoe outsole 1. The second layer 21 of EVA is then compression molded to the first layer 20 of EVA. Any EVA extending beyond the outer perimeter of the midsole mold 5 is trimmed, such as along line C-C depicted in FIG. 3a.

In a variation of this alternative embodiment, instead of bonding a second layer 21 of EVA to the bottom first layer 20 of EVA, a bottom surface of a shoe is fastened, such as with glue, over the top of the rubber shoe outsole 1 to adhere to the rubber shoe outsole 1 and/or to the bottom first layer 20 of EVA.

In some embodiments of the invention, different types of rubber would be used for different detents/lugs 2 in a single shoe sole, e.g., high-friction coefficient rubber for some lugs and natural rubber for other lugs. In one embodiment, every other lug (alternating lugs) would be made of different types of rubber, e.g., high-friction coefficient rubber and natural rubber; such a shoe would provide traction on both rock (with the high-friction coefficient rubber) and highly polished surfaces such as ice (with natural rubber). In another embodiment, the lugs on certain portions of the shoe would be made of one type of rubber; the lugs on other portions of the shoe sole would be made of another type of rubber. For example, the lugs on the end-most portion of the toe of the shoe sole and the end-most portion of the heel of the shoe sole could be made, e.g., of high-friction coefficient rubber; the lugs on the rest of the sole could be made with natural rubber.

Someone with ordinary skill in the art will understand that the varied-rubber embodiments described above are exemplary, are described to illustrate the invention, and are not a limitation of the invention. Rather, different types of rubber other than those described above could be used to form the lugs; different arrangements of the lugs could be used without departing from the spirit of the present invention.

In an alternative embodiment of the invention, instead of using integral support bridges 3 (as were depicted, e.g., in FIGS. 3b, 4) to stabilize and anchor the lugs 2 in the midsole 17, anchoring ribs, flanges or other anchors are provided radiating from the perimeter 52 of the detent 53 of a lug 2, exemplars of which are depicted in FIGS. 5a through 7c.

Figure 5A:
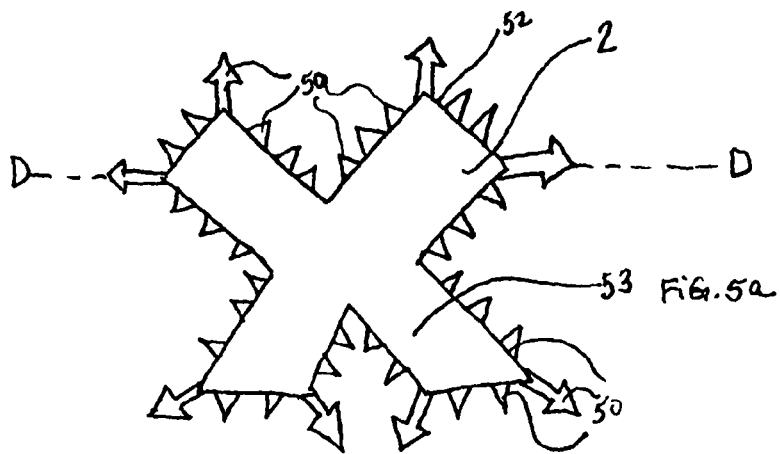
FIG. 5a is a top plan view of a first alternative exemplary lug of the present invention.
Figure 5B:
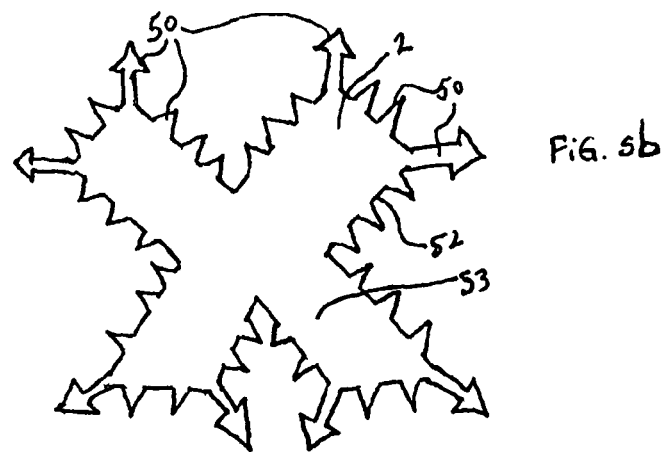
FIG. 5b is a bottom plan view of the first alternative exemplary lug of the present invention.
Figures 5C, 5D:
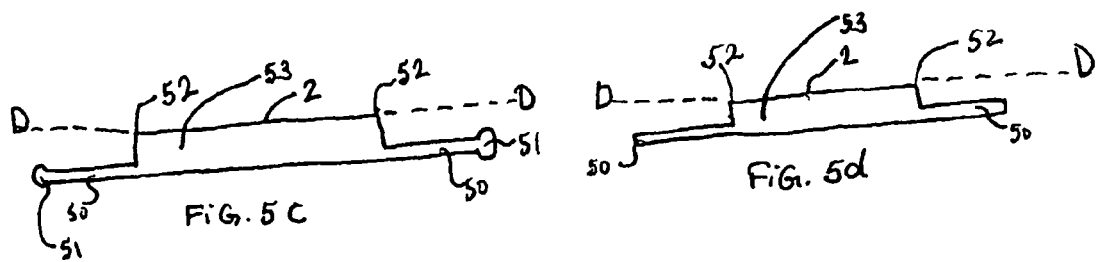

A first alternative exemplary embodiment of a lug 2 having ribs 50 radiating from the perimeter 52 of detent 53 of the lug 2 is depicted in FIG. 5a. FIG. 5b depicts the lug 2 and radiating ribs 50 from a bottom view. As will be understood by someone with ordinary skill in the art, the size, shape, number and arrangement of radiating ribs depicted and described are exemplary and illustrative of the invention, not a limitation of the invention. Rather, the size, shape, number and arrangement of the radiating ribs may vary without departing from the spirit of the invention. Each rib 50 may provide a knob 51 as depicted in FIG. 5c, or may have no knob as depicted in FIG. 5d. FIG. 5c is a cross-sectional side view along line D-D of FIG. 5a of a lug and a radial rib with a knob; FIG. 5d is a cross-sectional side view along line D-D of FIG. 5a of a lug and a radial rib without any knob.

Figure 7A:
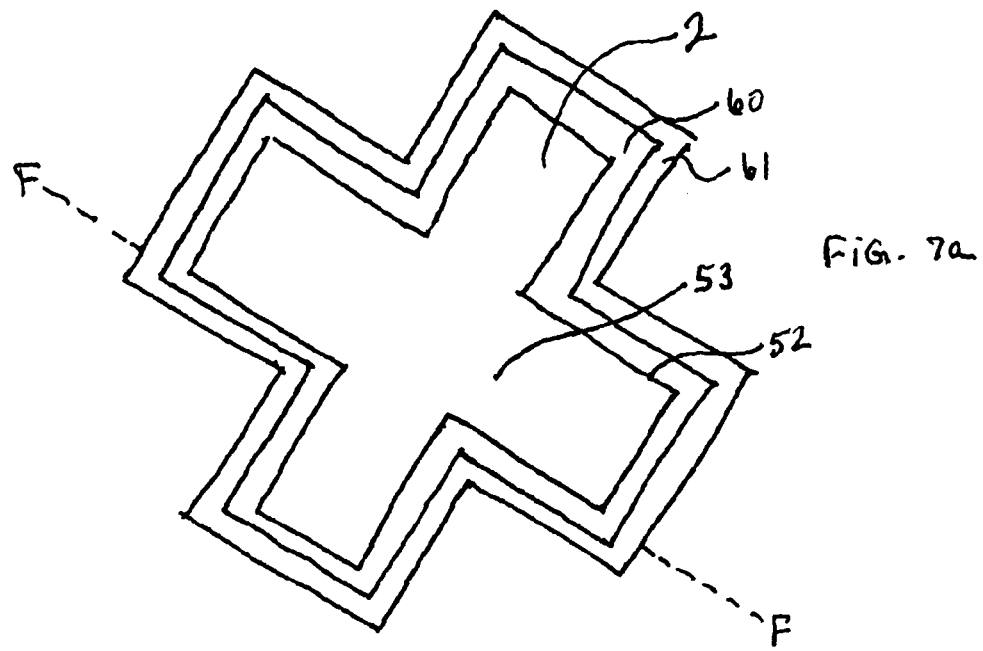
FIG. 7a is a top plan view of a second alternative exemplary lug of the present invention.
Figure 7B:
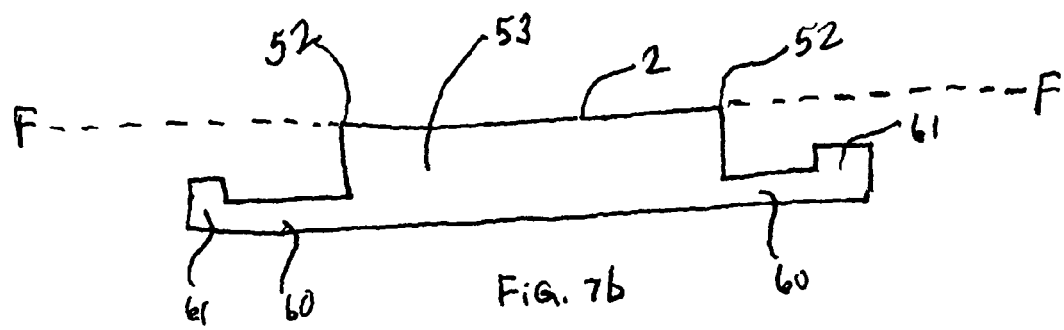

In a further alternative embodiment, a raised ridged flange 60, 61 surrounds the detent 53 of the lug 2 as depicted in FIGS. 7a and 7b. FIG. 7b is a cross-sectional side view of an exemplary lug 2 with a detent 53 and with a raised ridged flange 60, 61 taken along line F-F of FIG. 7a. As depicted in FIGS. 7a and 7b, a flange 60 with a raised ridge 61 extends from the perimeter 52 of the detent 53 of the lug 2.

Figure 7C:
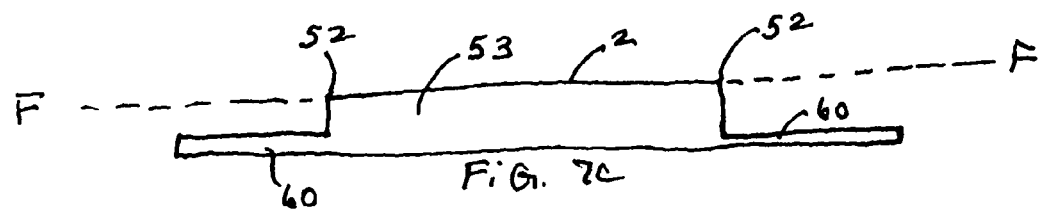

In a further alternative embodiment, as depicted in FIG. 7c, a flange 60 without any raised ridge could be used to anchor and stabilize a lug 2 in the midsole 17 without departing from the spirit of the invention. Still further, a flange with an irregular shape (not shown), or a shape that extends in various dimensions (not shown) from the perimeter 52 of the detent 53 of the lug 2 could be used to anchor and stabilize a lug 2 in the midsole 17 (see, e.g., FIG. 4) without departing from the spirit of the invention.

Figure 6A:
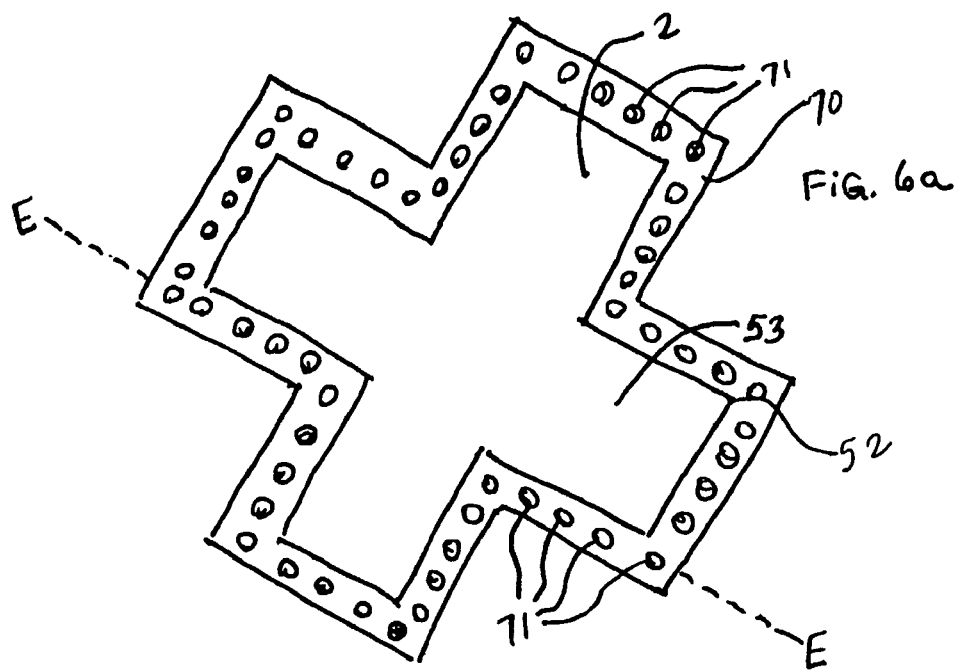
FIG. 6a is a top plan view of a third alternative exemplary lug of the present invention.
Figure 6B:
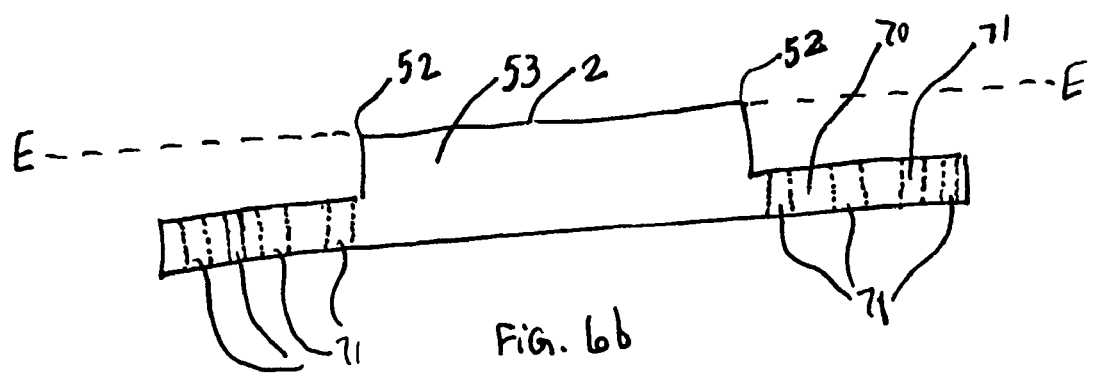

FIG. 6a depicts a lug 2 with a perforated flange 70 extending from the perimeter 52 of the detent 53 of the lug 2. FIG. 6b is a cross-sectional side view of this lug 2 with its perforated flange 70, taken along line E-E of FIG. 6a. As depicted in FIGS. 6a and 6b, perforations 71 penetrate through the flange 70. The midsole 17 (see, e.g., FIG. 4) material would penetrate the perforations 71 to anchor and stabilize the lug in the midsole 17 (see, e.g., FIG. 4).

As will be understood by someone with ordinary skill in the art, the depicted number, size, shape and arrangement of the perforations 71 and the depicted size and shape of the flange 70 are exemplary to illustrate the invention, not a limitation of the invention. Rather, the number, size, shape and arrangement of the perforations 71 and the size and shape of the flange 70 can be varied without departing from the spirit of the invention.

In an alternative application of the present invention, a cylindrical rubber tire outer (not shown) is formed with tire tread detents similar to the detent/lugs 2 of the rubber shoe outer 1. Integral support bridges extend between the tire tread detent/lugs in a manner similar to that in which the integral support bridges 3 extend between the detent/lugs 2 of the rubber shoe outer 1. The cylindrical rubber tire outer is placed in a cylindrical tire mold comprising indentations corresponding to the tire tread of the cylindrical rubber tire outer in a manner similar to the indentations 4 of the shoe midsole mold 5. A second material, such as polyurethane, is then blown into the cylindrical rubber tire outer mold to form the non-tire tread rubber portion of the tire. As with the above-disclosed shoe sole lugs, integral support bridges 3, radial ribs 52, and flanges e.g., 60, 62, 70 as depicted in FIGS. 5a through 7b, could be used to anchor tire lugs in a tire outer.

ILLUSTRATIVE EMBODIMENTS

Although the present invention has been described in certain specific embodiments, many additional modifications and variations would be apparent to those skilled in the art. It is, therefore, to be understood that this invention may be practiced otherwise than as specifically described. Thus, the embodiments of the present invention described herein should be considered in all respects as illustrative and not restrictive, the scope of the invention to be determined by the appended claims and their equivalents rather than the foregoing description.

What is claimed is:

1. A shoe sole, said shoe sole comprising:
    a midsole comprising a first surface adapted for attaching to a bottom of a shoe upper and an exposed surface, wherein the exposed surface opposes the first surface of the midsole;
    at least one outsole lug, wherein the at least one outsole lug comprises an imbedded end and an exposed end, wherein the imbedded end comprises a perimeter and further comprises an anchor extending radially from the perimeter, wherein at least a portion of the anchor underlies the exposed surface of the midsole; and
    a plurality of ribs extending radially from the perimeter of the imbedded end of the at least one outsole lug, wherein at least a portion of an at least a first rib of the plurality of ribs underlies the exposed surface of the midsole.

2. The shoe sole of claim 1, wherein an at least one rib of the plurality of ribs comprises a distal end, wherein the distal end of the at least one rib comprises a knob, and wherein the distal end is imbedded underneath the exposed surface of the midsole.

3. The shoe sole of claim 1, wherein the anchor further comprises:
    a flange extending from the perimeter of the imbedded end of the at least one outsole lug, wherein the flange is imbedded underneath the exposed surface of the midsole.

4. The shoe sole of claim 3, wherein the flange further comprises:
    a raised ridge.

5. The shoe sole of claim 3, wherein the flange is perforated.

6. A shoe sole, said shoe sole comprising:
    a midsole comprising a first surface adapted for attaching to a bottom of a shoe upper and an exposed surface, wherein the exposed surface opposes the first surface of the midsole; and
    at least one outsole lug, wherein the at least one outsole lug comprises an imbedded end and an exposed end, wherein the imbedded end comprises a perimeter and further comprises an anchor extending from the perimeter, wherein the anchor underlies the exposed surface of the midsole, wherein the anchor further comprises a plurality of ribs extending radially from the perimeter of the imbedded end of the at least one outsole lug, and wherein an at least one rib of the plurality of ribs comprises a distal end, and wherein the distal end of the at least one rib comprises a knob.

* * * * *